United States Patent [19]
Chiang et al.

[11] Patent Number: 5,149,773
[45] Date of Patent: Sep. 22, 1992

[54] POLYQUINOXALINE AND THE METHOD OF PREPARATION

[75] Inventors: Long Y. Chiang, Somerset, N.J.; John W. Swirczewski, Kintnersville, Pa.

[73] Assignee: Exxon Research and Engineering Company, Florham Park, N.J.

[21] Appl. No.: 726,149

[22] Filed: Jun. 24, 1991

Related U.S. Application Data

[63] Continuation of Ser. No. 482,459, Feb. 21, 1990, abandoned.

[51] Int. Cl.$^5$ ............................................. C08G 73/00
[52] U.S. Cl. ..................................... 528/423; 525/420
[58] Field of Search .......................................... 528/423

[56] References Cited

U.S. PATENT DOCUMENTS
4,727,135  2/1988  Chiang et al. ...................... 528/423

OTHER PUBLICATIONS
The Condensed Chemical Dictionary, 1971, p. 448.

*Primary Examiner*—Harold D. Anderson
*Attorney, Agent, or Firm*—Joseph J. Dvorak

[57] ABSTRACT

Novel polymers consisting essentially of recurring moieties selected from polyquinoxaline and substituted polyquinoxalines are disclosed. These polymers are prepared by contacting 1,,2,3,4-tetrahydroquinoxaline or 1,2,3,4-organo substituted tetrahydroquinoxaline compounds with a transition metal sulfide catalyst at elevated temperatures. Also disclosed are quaternary ammonium derivatives of the novel polymers, their preparation and use.

11 Claims, No Drawings

POLYQUINOXALINE AND THE METHOD OF PREPARATION

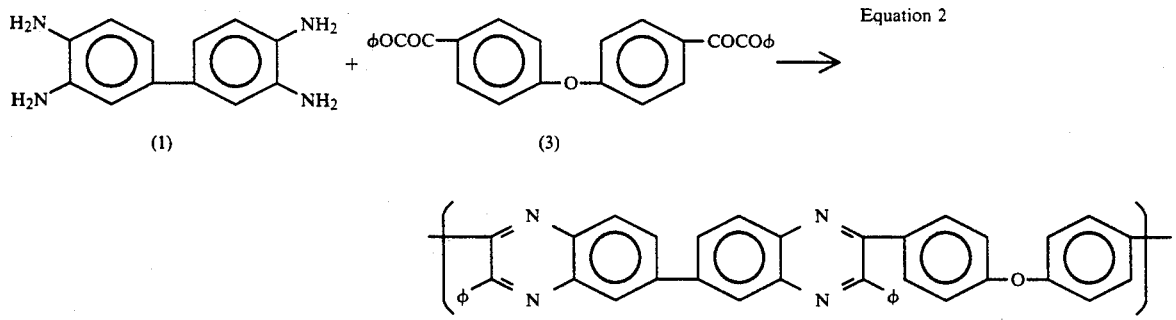

This application is a continuation of application Ser. No. 482,459, filed Feb. 21, 1990, now abandoned.

FIELD OF THE INVENTION

The present invention relates to novel polymers having repeating quinoxaline and substituted quinoxaline moieties.

BACKGROUND OF THE INVENTION

Polyaromatic compounds are of considerable interest because of their oxidative stability, thermal stability and, in some instances, their interesting electrical properties. Among the polyaromatic compounds, poly (phenylquinoline) and its derivatives are generally the most thermal oxidative stable polyaromatic polymers.

In U.S. Pat. No. 4,727,135 a polymer consisting essentially of recurring non-substituted polyquinoline moieties was reported. The non-substituted polyquinoline compound, as well as certain substituted polyquinoline compounds, was disclosed as being prepared by the catalytic dehydrogenative polymerization of tetrahydroquinoline and certain organo-substituted hydroquinoline derivatives.

Other heterocyclic containing polymers that have been investigated because of their potential utility in applications which demand high thermal and oxidative stability are the so-called polyquinoxalines and poly (phenylquinoxalines). (See Hergenrother, Paul M.,*J. Macromol Sci.-Revs. Macromol. Chem.*, C6(1), 1 –28 (1971). These polymers are formed, for example, by the condensation reaction between bis (o-diamines), such as 3,3'- diaminobenzidine (1) with aromatic bis-glyoxals, such as p, p'-oxybis(phenyleneglyoxal hydrate) (2) as shown in Equation 1

Other variations have been recorded in the Hergenrother reference. In all instances, however, the repeating unit in the polymer does not consist solely of quinoxaline or substituted quinoxaline moieties but, instead, they consist of moieties including a quinoxaline unit linked to some other structural unit such as phenyl ether, and the like.

SUMMARY OF THE INVENTION

According to the present invention, it has been discovered that a 1,2,3,4-tetrahydroquinoxaline having the formula

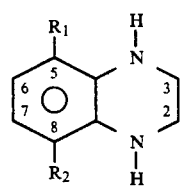

wherein $R_1$ and $R_2$ may be the same or different and are selected from hydrogen, alkyl, aryl, aralkyl and alkaryl groups is polymerized in the presence of a transition metal sulfide catalyst to yield a polymer having the formula

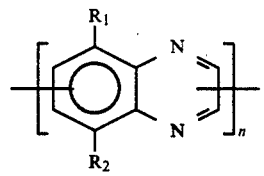

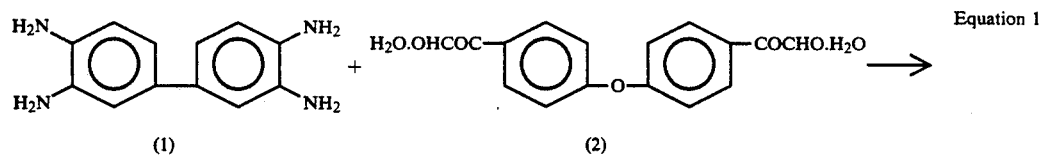

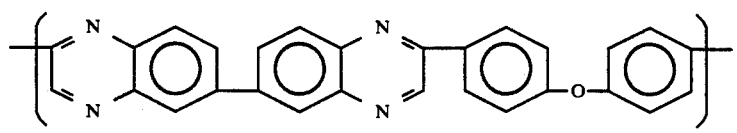

wherein R₁ and R₂ are the same as in the tetrahydroquinoxaline polymerized and n is an integer equal to or greater than 2.

Thus, in one embodiment of the present invention there is provided a novel homopolymer consisting essentially of recurring moieties selected from polyquinoxaline and substituted polyquinoxaline moieties. Indeed, the polymer is represented by the formula

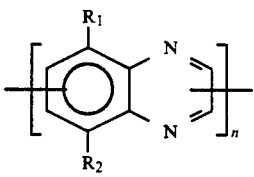

wherein R₁ and R₂ may be the same or different and are selected from hydrogen, alkyl, aryl, aralkyl and alkaryl groups and n is an integer equal to or greater than 2. These new polymers have utility in polymer applications requiring thermal and oxidative stability, such as in high temperature structural, electronic, and nonlinear optical materials usage.

In another embodiment of the present invention, there is provided a method of preparing a homopolymer consisting essentially of recurring moieties selected from quinoxaline and substituted quinoxaline moieties, which method comprises contacting a 1,2,3,4-tetrahydroquinoxaline compound having the formula

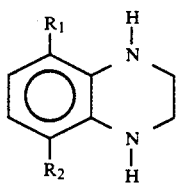

wherein R₁ and R₂ may be the same or different and are selected from hydrogen, alkyl, aryl, aralkyl and alkaryl groups with a transition metal sulfide catalyst at a temperature and for a time sufficient to dehydrogenatively polymerize the 1,2,3,4-tetrahydroquinoxaline compound.

In yet another embodiment of the present invention, novel quaternary derivatives of the quinoxaline and substituted quinoxaline polymers are provided. These quaternary derivatives are useful as metal corrosion inhibitors.

These and other embodiments of the present invention will become readily apparent upon a reading of the Detailed Description which follows.

DETAILED DESCRIPTION OF THE INVENTION

As indicated in the Summary above, the present is concerned with the polymerization of tetra hydroquinoxaline compounds, such as 1,2,3,4-tetrahydroquinoxaline and mono- and diorgano substituted 1,2,3,4-tetrahydroquinoxalines. The compounds that are capable of being polymerized in accordance with the present invention can be represented by the formula:

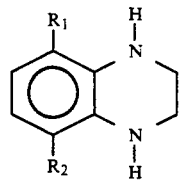

wherein R₁ and R₂ may be the same or different and are selected from hydrogen and organo groups.

The organo substituent on the tetrahydroquinoline compound may be selected from alkyl, aryl, alkaryl and aralkyl groups. Typically, the organic group will have no more than about 30 carbon atoms. For example, when the organo substituent is an alkyl group, it will generally have from about 1 to 30 carbon atoms and preferably from about 1 to 20 carbon atoms. When the organo substituent is aryl, it will have at least 6 carbon atoms; however, it may have up to 30 carbon atoms. For example, if the aryl group is an alkyl substituted aryl group, it would have alkyl groups of from about 1 to 24 carbon atoms. In other words, if the organo group is aralkyl or alkaryl, it will have from about 7 to 30 carbon atoms.

As between 1,2,3,4-tetrahydroquinoxaline and organo substituted 1,2,3,4-tetrahydroquinoxalines, the 1,2,3,4-tetrahydroquinoxaline is the preferred starting material in the practice of the present invention.

The catalysts employed in the process of the present invention are selected from transition metal sulfide catalysts in which the transition metal is selected from the group consisting of transition metals of Groups VIB, VIIB and VIII of the Periodic Table (see *The Merck Index*, 10th Edition, Merck & Company, Inc., Rahway, N.J.) and mixtures thereof. Rhenium sulfide, ruthenium sulfide and rhodium sulfide are particularly preferred catalysts. Indeed, suitable rhenium sulfide catalysts may be prepared as described in U.S. Pat. No. 4,308,171, which is incorporated herein by reference.

The polymerization of the 1,2,3,4-tetrahydroquinoxaline or organo substituted 1,2,3,4-tetrahydroquinoxaline is conducted by contacting the tetrahydroquinoxaline compound with the transition metal sulfide while heating them at temperatures above about 180° C. for a time sufficient to result in the formation of the polymer. Indeed, in the practice of the present invention, heating the 1,2,3,4-tetrahydroquinoxaline compound and catalyst is conducted generally in the range of about 180° C. to about 300° C. and preferably in the range of about 250° C. to 280° C. The time of contacting and heating depends, of course, upon the specific tetrahydroquinoxaline compound employed, the catalyst used and the temperature selected. As a general guide, however, at temperatures of about 250° C. to about 280° C., contact times are of the order of about 12 to 96 hours. The products of the process of the present invention have the formula

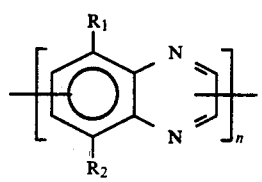

wherein $R_1$ and $R_2$ may be the same or different and are selected from hydrogen and organo substituents, especially alkyl, aryl, alkaryl or aralkyl groups having up to about 30 carbon atoms and wherein n is an integer $\geq 2$. In general, n is in the range of from about 2 to about 30.

The polyquinoxaline compounds made by the process of the present invention are converted to novel quaternary ammonium compounds by interaction with alkylating agents, especially aralkyl benzyl halides, $\alpha,\alpha'$-dihaloxylenes, dialkyl sulfates, dialkoxy carbonium salts and trialkyl oxonium salts like:

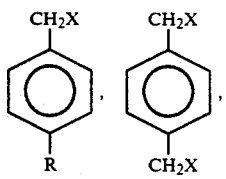

$(R'O)_2SO_2$, $(R'O)_2CHBF_4$, and $(R')_3OBF_4$ wherein x is chlorine, bromine or iodine, R is hydrogen or an alkyl group having from 1 to about 20 carbon atoms and R' is an alkyl group having from about 1 to 20 carbon atoms.

The novel quaternary polyquinoxalinium salts are represented by one of the following formula:

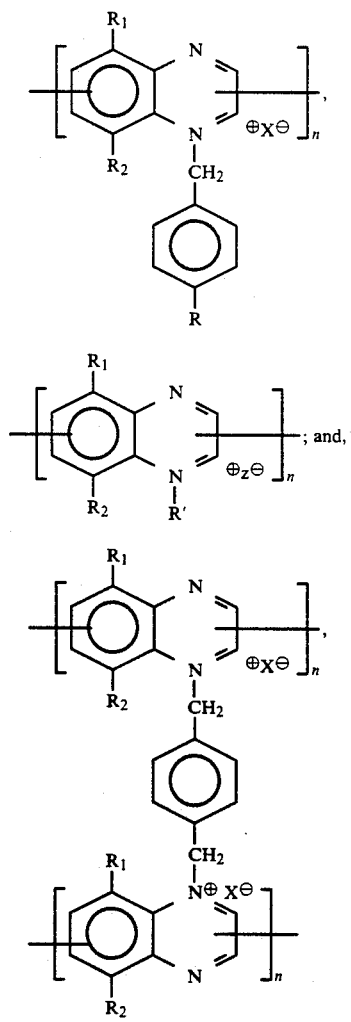

wherein n is an integer $\geq 2$, $R_1$ and $R_2$ may be the same or different and are selected from hydrogen, alkyl, aryl, aralkyl and alkaryl groups, R' is an alkyl group of from 1 to about 20 carbon atoms, $x^-$ is a chloride, bromide or iodide and $z^-$ is an anion selected from $R'SO_4^-$, $BF_4^-$, $ClO_4^-$ and $PF_6^-$.

The quaternary polyquinoxalinium salts are particularly useful as metal corrosion inhibitors.

EXAMPLES

In the examples which follow, all of the chemical reactants were commercially available compounds that were used as received.

A. THE GENERAL PROCEDURE FOR THE SYNTHESIS OF 1,2,3,4-TETRAHYDROQUINOXALINE COMPOUNDS

The synthesis of 1,2,3,4-tetrahydroquinoxaline compounds has been reported in *J. Organ. Chem.*, 24, 205 (1959). A modified version of that procedure was employed herein.

Basically, a 500 ml, three-necked flask was charged with lithium aluminum hydride (300 Ml, 1M in THF, 300 mmol) under an inert atmosphere. To the lithium aluminum hydride was added 2-keto-1,2-dihydroquinoxaline (22 g, 0.15 mol) in dry THF (100 ml) in small portions to prevent a sharp rise of temperature. After the addition was complete, the mixture was heated at the refluxing temperature of THF for 4 hours. The excess lithium aluminum hydride was decomposed by a slow addition of ethylacetate (10 ml) at room temperature. The resulting mixture was dropped slowly into ice water and extracted with diethyl ether. The diethyl ether solution was dried over anhydrous $MgSO_4$, filtered and the solvent evaporated to give a yellow solid. The solid was recrystallized in hexane to give 1,2,3,4-tetrahydroquinoxaline in 66% yield.

B. GENERAL PROCEDURE FOR THE SYNTHESIS OF TRANSITION METAL SULFIDE CATALYSTS

Method A

A three-neck flask (250 ml) connected with a condensor and a hydrogen sulfide inlet tube was charged with 1,2,3,4-tetrahydroquinoxaline (15 g) and acetonitrile (100 ml) and maintained under an inert atmosphere. While stirring, the transition metal chloride (1.4 millimoles); e.g., rhenium pentachloride, $ReCl_5$, ammonium hexachlororuthenate, $(NH_4)_2RuCl_6$, molybdenum pentachloride, $MoCl_5$ or rhodium trichloride, $RhCl_3$ was added over a period of 30 minutes to prevent a sharp rise in temperature above 80° C. After stirring the mixture for an additional one hour, it was purged below the liquid surface with hydrogen sulfide for one hour at a rate of 20 ml/min. It was then stirred for 4 hours at ambient temperature. The solvent of the resulting suspension was evaporated to give 1,2,3,4-tetrahydroquinoxaline solids containing nearly 2 to 3% by weight of transition metal sulfide. The resulting mixture can be used directly for the polymerization reaction as described in Example 1 below.

Method B

A 2-liter, single-neck flask with a large magnetic stirring bar was charged with absolute ethanol (1 L) and maintained at 55° C. With stirring lithium sulfide (12.6 g, 0.35 mol) was added slowly over a period of one-half hour. The resulting suspension was allowed to cool to room temperature. Ammonium hexachlororuthenate (35 g, 0.1 mol) was added over a period of 1.5 hours and the stirring continued for 48 hours. The resulting black suspension was separated by filtration via suction through a medium sintered glass funnel. The solids collected were washed with warm ethanol (3 times, 200 ml each) and dried at 50° C. in a vacuum oven to give a black ruthenium sulfide in quantitative yield.

Method C

To a 500 ml three-necked flask connected to a hydrogen sulfide gas inlet tubing was charged with ammonium perrhenate (13.4 g, 50 mmol), water (100 ml), and acetic acid (13.3 ml). To the resulting solution was added sodium hydroxide (approximately 3.9 g) until a pH value of 4.2 was reached. The mixture was purged with hydrogen sulfide for 0.5 hr, then heated to 50° C. for 6 hr while continuing hydrogen sulfide purge (50 ml/min). After 6 hr, the black product solid was filtered out of solution by means of vacuum filtration collected on a fritted funnel and washed with hot $H_2O$. The solid was further soxhletted with $H_2O$ for 24-48 hr to remove any unreacted ammonium perrhenate. The solid was then dried in a vacuum at room temperature to yield rhenium sulfides (11.5 g). Elemental analysis of the dried product best fits a composition of $ReS_{3.8}O_{0.6}.3-H_2O$.

EXAMPLES 1, 2 AND 3

These examples describe the catalytic dehydrogenative polymerization of 1,2,3,4-tetrahydroquinoxaline. A three-neck flask (50 ml) equipped with a condenser and a magnetic stirring bar was charged with 1,2,3,4-tetrahydroquinoxaline (15 g) containing 2 to 3% by weight of the metal sulfide prepared by Method B or C described above or by a thorough mixing of the 1,2,3,4-tetrahydroquinoxaline and the metal sulfide synthesized according to Method A above. The suspended mixture was maintained under an argon atmospheric pressure and heated at 270° C. for 48 hours. At the end of the reaction, the resulting product was cooled to room temperature to give a dark solid. It was transferred into a chloroform solution (15 to 25 ml per gram of product), forming a suspension which was stirred overnight at 60° C. The insoluble solid was then filtered and washed with another portion of chloroform (50 ml). The solvent of the combined chloroform solution was evaporated to give a dark brown solid. It was suspended and stirred in diethyl ether (20 to 25 ml per gram sample) for 8 hours. The insolubles were filtered and washed with diethyl ether (50 ml) to yield a brown solid polymer fraction C (PFC), which is chloroform soluble and diethyl ether insoluble. The solvent of the combined diethyl ether filtrate was evaporated to give a reddish sludge. It was then suspended and stirred in hexane (20 ml per gram of sample) for 8 hours. The insoluble solid was filtered and washed with hexane (100 ml) to yield a polymer product fraction B (PFB), which is diethyl ether soluble and hexane insoluble. The remaining hexane solubles were dried to give product fraction A (PFA).

The chloroform insolubles from the first solvent extraction were further extracted with pyridine (20 ml per gram of sample) to yield a polymer fraction D, which is pyridine soluble and chloroform insoluble. The pyridine insolubles were subsequently treated with concentrated HCL (10 ml per gram of sample) and stirred at 50° C. for 12 hours. The resulting acid solution was filtered through a sintered glass frit and celite under vacuum. The collected acid solution was neutralized with NaOH to effect precipitation of a brown solid, which was then washed with distilled water and dried at 50° C. under vacuum to give polymer fraction E (PFE).

The characterization of the products was performed by various spectroscopic methods. Data obtained from $^1H$ NMR, $^{13}C$ NMR, IR spectra and Mass spectra were found to be consistent with the aromatic structure of polyquinoxaline. Further details are given in Table I, which follows.

TABLE I

| Exam. | Sulfide Catalyst | % Yield PFA | % Yield PFB | % Yield PFC | % Yield PFD | % Yield PFE | % Yield Total |
|---|---|---|---|---|---|---|---|
| 1 | $RuS_x$ (Method A) | — | 2.0 | 4.4 | 28.4 | 62.2 | 97 |
| 2 | $RuS_x$ (Method B) | 3.0 | 15.1 | 1.1 | 23.5 | 57.3 | 100 |
| 3 | $ReS_x$ (Method C) | 1.0 | 3.1 | 10.8 | 35.4 | 47.7 | 98 |

EXAMPLE 4

This example illustrates the synthesis of quaternary polyquinoxalinium salts.

To a one-neck, round bottom flask connected with a condenser was charged with dimethyl formamide solution (100 ml) of quinoxaline oligomers (50 mmol) and dimethyl sulfate (7.6 g, 60 mmol, 1.2 equivalence). The mixture was stirred at 90° to 110° C. for at least 10 hours. After being cooled to room temperature, it was added into an ether solution (600 ml) to complete the precipitation of the product. The precipitates were filtered, washed with ether and dried in vacuum to give a brownish-red solid of methyl quinoxalinium methylsulfate oligomers in 68% yield.

EXAMPLE 5

In this example, the corrosion inhibiting properties of the quaternary ammonium salt prepared in Example 4 was tested by immersing, for 24 hours, a weighed sample of 304 stainless steel in concentrated HCl containing 0.3% by weight of the quaternary polyquinoxalinium salt. The sample was removed, washed with water, dried and reweighed to determine the weight loss. For comparative purposes, another weighed sample of steel was immersed in concentrated HCl for 24 hours and the weight loss measured. The sample that was immersed in the acid containing the quaternary polyquinoxalinium salt lost 92.5% less weight.

What is claimed is:

1. A homopolymer consisting essentially of recurring moieties of 1,2,3,4-tetrahydroquinoxaline, monoorgano-substituted 1,2,3,4-tetrahydroquinoxaline or diorgano-substituted 1,2,3,4-tetrahydroquinoxaline.

2. A homopolymer consisting essentially of recurring moieties selected from the group consisting of polyquinoxaline and substituted quinoxaline moieties, wherein the moieties have the formula

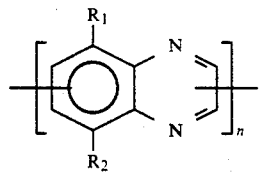

and wherein $R_1$ and $R_2$ are each selected from the group consisting of hydrogen and organo groups, and wherein $R_1$ and $R_2$ are the same as each other or are different from each other and wherein n is an integer greater than or equal to two.

3. The polymer of claim 2 wherein the organo groups are selected from the group consisting of alkyl, aryl, aralkyl and alaryl groups having up to about 30 carbon atoms.

4. The polymer of claim 2 wherein $R_1$ and $R_2$ are hydrogen.

5. The polymer of claim 3 wherein the organo group is an alkyl group having from 1 to 24 carbon atoms.

6. A method for preparing a homopolymer consisting essentially of recurring moieties selected from the group consisting of polyquinoxaline and quinoxaline moieties wherein the moieties have the formula

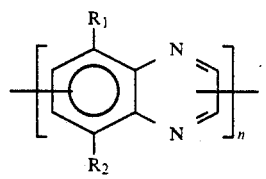

which method comprises: contacting (a) a 1,2,3,4-tetrahydroquinoxaline compound selected from the group consisting of 1,2,3,4-tetrahydroquinoxaline monoorgano-substituted 1,2,3,4-tetrahydroquinoxaline and diorgano-substituted 1,2,3,4-tetrahydroquinoxaline having the formula

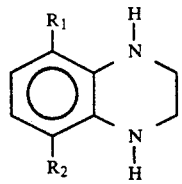

wherein $R_1$ and $R_2$ are the same as each other or are different from each other and such $R_1$ and $R_2$ are each selected from the group consisting of hydrogen and organo groups, and (b) a transition metal sulfide catalyst in which the transition metal is selected from the group consisting of Group VIB, VIIB and VIII of the Periodic Table wherein contacting occurs at a temperature for a time sufficient for the dehydrogenative polymerization of the 1,2,3,4-tetrahydroquinoxaline compound to occur.

7. The method of claim 6 wherein the temperature is above about 180° C.

8. The method of claim 6 wherein the transition metal is rhenium.

9. The method of claim 6 wherein the transition metal is ruthenium.

10. The method of claim 6 wherein the transition metal is rhodium.

11. The method of claim 6 wherein the contacting is for a time from about 12 hours to about 96 hours.

* * * * *